(12) United States Patent
Majumdar et al.

(10) Patent No.: US 7,532,290 B2
(45) Date of Patent: May 12, 2009

(54) BARRIER LAYERS FOR COATING CONDUCTIVE POLYMERS ON LIQUID CRYSTALS

(75) Inventors: Debasis Majumdar, Rochester, NY (US); Gary S. Freedman, Webster, NY (US); Glen C. Irvin, Jr., Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 4 days.

(21) Appl. No.: 11/131,889

(22) Filed: May 18, 2005

(65) Prior Publication Data

US 2006/0262260 A1 Nov. 23, 2006

(51) Int. Cl.
*G02F 1/1333* (2006.01)

(52) U.S. Cl. .......................................... 349/122; 349/84

(58) Field of Classification Search .................... 349/84, 349/88, 143, 86, 122; 428/220; 525/186; 345/107
See application file for complete search history.

(56) References Cited

U.S. PATENT DOCUMENTS

| | | | |
|---|---|---|---|
| 3,600,060 A | 8/1971 | Churchill et al. | |
| 3,816,786 A | 6/1974 | Churchill et al. | |
| 4,435,047 A | 3/1984 | Fergason | |
| 5,251,048 A | 10/1993 | Doane et al. | |
| 5,300,575 A * | 4/1994 | Jonas et al. | 525/186 |
| 5,682,216 A * | 10/1997 | Lin et al. | 349/122 |
| 5,738,934 A * | 4/1998 | Jones | 428/220 |
| 5,828,432 A * | 10/1998 | Shashidhar et al. | 349/139 |
| 5,973,050 A * | 10/1999 | Johnson et al. | 524/439 |
| 6,025,119 A * | 2/2000 | Majumdar et al. | 430/529 |
| 6,753,937 B2 | 6/2004 | Grupp | |
| 6,788,362 B2 | 9/2004 | Stephenson et al. | |
| 6,831,712 B1 | 12/2004 | Stephenson et al. | |
| 6,864,875 B2 * | 3/2005 | Drzaic et al. | 345/107 |
| 6,885,409 B2 | 4/2005 | Stephenson et al. | |
| 7,170,481 B2 * | 1/2007 | Doane et al. | 345/87 |
| 2005/0068257 A1 | 3/2005 | Stephenson et al. | |
| 2005/0195354 A1 * | 9/2005 | Doane et al. | 349/143 |
| 2006/0215077 A1 * | 9/2006 | Majumdar et al. | 349/88 |

OTHER PUBLICATIONS

Pending U.S. Appl. No. 11/059,720, Majumdar et al., *Conductive Absorption Layer For Flexible Displays*, filed Feb. 16, 2005.
Pending U.S. Appl. No. 10/954,722, Aylward et al., *Substrate Free Flexible Liquid Crystal Displays*, filed Sep. 30, 2004.

* cited by examiner

*Primary Examiner*—Mike Qi
(74) *Attorney, Agent, or Firm*—Alston & Bird LLP (57) ABSTRACT

The present invention relates to a bistable reflective display comprising a water-swellable, electrically modulated imaging layer, a conductive layer comprising an electronically conductive polymer and a barrier layer therebetween and a method for making the same.

32 Claims, 1 Drawing Sheet

FIG. 1

BARRIER LAYERS FOR COATING CONDUCTIVE POLYMERS ON LIQUID CRYSTALS

FIELD OF THE INVENTION

The present invention relates to a barrier layer between an electronically conductive polymer layer and a liquid crystal layer comprising water swellable or soluble polymer for use in reflective bistable electrically modulated displays.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically written areas to carry ticketing or financial information, however magnetically written data is not visible.

Media systems exist that maintain electronically changeable data without power. Such system can be electrophoretic (E-ink), Gyricon or polymer dispersed cholesteric materials. An example of an electronically updateable display can be found in U.S. Pat. No. 3,600,060, that shows a device having a coated then dried emulsion of cholesteric liquid crystals in aqueous gelatin to form a field responsive, bistable display. U.S. Pat. No. 3,816,786 discloses a layer of encapsulated cholesteric liquid crystal responsive to an electric field. The electrodes can be transparent or nontransparent and formed of various metals or graphite. It is disclosed that one electrode must be light absorbing and it is suggested that the light absorbing electrode be prepared from paints containing conductive material such as carbon.

Fabrication of flexible, electronically written display sheets is disclosed in U.S. Pat. No. 4,435,047. A substrate supports a first conductive electrode, one or more layers of encapsulated liquid crystals, and a second electrode of electrically conductive ink. The conductive inks form a background for absorbing light, so that the display areas appear dark in contrast to non-display areas. Electrical potential applied to opposing conductive areas operates on the liquid crystal material to expose display areas. Because the liquid crystal material is nematic liquid crystal, the display ceases to present an image when de-energized. Dyes in either the polymer encapsulant or liquid crystal material absorb incident light. The dyes are part of a solution, and not solid submicron particles. U.S. Pat. No. 4,435,047 further discloses the use of a chiral dopant in example 2. The dopant improves the response time of the nematic liquid crystal, but does not create a light reflective state. The display structures disclosed are not bistable in the absence of an electrical field.

U.S. Pat. No. 5,251,048 discloses a light modulating cell having a polymer dispersed chiral nematic liquid crystal. The chiral nematic liquid crystal has the property of being electrically driven between a planar state reflecting a specific visible wavelength of light and a light scattering focal conic state. Chiral nematic liquid crystals, also known as cholesteric liquid crystals, have the capacity of maintaining one of multiple given states in the absence of an electric field. Black paint is applied to the outer surface of rear substrate to provide a light absorbing layer outside of the area defined by the intersection of segment lines and scanning lines.

U.S. Pat. No. 6,753,937 to Grupp discloses a reflective liquid crystal display devices, an absorbent black layer which is usually deposited on the lower face of the back substrate, arranged at a higher level than the level of the back substrate. In this way, the number of so called parasite reflections or back scatter of the incident light at the interfaces between two materials or mediums of different indices is reduced. This allows the display contrast to be improved. Grupp discloses a polymer dispersed liquid crystal device having a first group of transparent electrodes, a second group of electrodes, and a black colored absorbent layer made of electrically nonconductive material that is an insulating lacquer, Heatsinkpaste® HSP 2741 by Lack Verke GmbH. The invention of Grupp requires separate processes for depositing the absorbent black layer and the second conductor. The absorbent black layer is suggested by Grupp to be coated by silk-screen printing, tampo printing, flexographic printing or vapor deposition.

U.S. Pat. No. 6,788,362 discloses a thin, dark light absorbing layer between two thinly spaced, parallel electrodes operating on polymer dispersed cholesteric liquid crystal displays, in which, if the light absorbing layer for a display having polymer dispersed cholesteric liquid crystals is not field carrying and not electrically conductive, it is possible to position such layer between electrodes to provide improved image quality. Accordingly, the light absorbing layer does not carry a field beyond limits defined by the intersection or overlap of the two electrodes. The disclosed display has polymer dispersed liquid crystals, comprising a transparent substrate, a polymer dispersed cholesteric liquid crystal disposed over the substrate and defining first and second surfaces, a transparent conductor disposed over the first surface of the state changing layer, a second conductor on the second surface of the state changing layer, and a nonconductive, non-field spreading layer comprising a submicron pigment and binder disposed between the polymer dispersed cholesteric liquid crystal layer and the second conductor to provide a light absorbing layer. Fine, preferably submicron, particles of pigment in a binder provide an electro-chemically stable light absorber that maximizes light absorption in the pigment-containing layer, while preventing field spreading beyond the perimeter of the second electrode. Suggested polymers useful for dispersing liquid crystals included water swellable or soluble polymers such as gelatin, polyvinyl alcohol and polyethylene oxide.

A vast majority of prior art literature in the field of polymer dispersed liquid crystal displays, show the preference for indium tin oxide (ITO) for use as transparent electrodes. Although quite effective, indium tin oxide is typically deposited under vacuum conditions in a batch process at a relatively slow speed, thus adding time and cost to the deposition process. Moreover, due to the inherent brittleness of indium tin oxide, its application in flexible display can be somewhat tenuous, as flexing the substrate can cause serious cracking and thus loss of conductivity in the electrode.

Electronically conductive polymers, such as polythiophene, have been proposed as a substitute for indium tin oxide for use as electrodes for bistable displays comprising polymer-dispersed liquid crystal layer: for example, vide U.S. Pat. Nos. 6,831,712; 6,885,409; US20050068257 A1; and U.S. application Ser. No. 10/954,722.

However, it has been found that when such conductive polymers are coated from aqueous coating compositions directly over the polymer dispersed liquid crystal layer, particularly those comprising a water swellable/soluble binder such as gelatin, the overall surface electrical resistance (SER) of the conductive polymer layer becomes very high. To compensate for such high SER one needs to coat a significantly thicker layer of the electronically conductive polymer leading to higher cost and lower transparency.

Problem to be Solved

The invention solves the problem of high surface electrical resistance SER of electronically conductive polymer layers coated out of aqueous coating compositions over water swellable or soluble polymer dispersed liquid crystal layers.

SUMMARY OF THE INVENTION

The present invention relates to a bistable reflective display comprising a water-swellable, electrically modulated imaging layer, a conductive layer comprising an electronically conductive polymer and a barrier layer therebetween. The present invention also relates to a method for making a bistable reflective display comprising providing a substrate; applying a water-swellable, electrically modulated imaging layer; applying a conductive layer; and applying a barrier layer between said electrically modulated imaging layer and said conductive layer.

Advantageous Effect of the Invention

The present invention includes several advantages, not all of which are incorporated in a single embodiment. The invention provides a conductive layer, also referred to as an electrode, that can be coated on a wide flexible substrate by a continuous hopper or roller coating method at high speed (compared to a batch process such as vacuum deposition) enabling the "roll to roll" fabrication of display devices which are more flexible, lower cost, lower weight and easily manufacturable. The invention further provides an electronically conductive polymer electrode, which is not as brittle as an ITO electrode thus providing more robust performance under flexure. The invention also provides an electrode that can be coated from an aqueous composition and hence environmentally desirable. Moreover, the electronically conductive polymer electrode of the invention provides a highly transparent layer desirable for display applications.

DETAILED DESCRIPTION OF THE INVENTION

The present invention relates to a bistable reflective display including at least a water-swellable, electrically modulated imaging layer, a conductive layer comprising a water-compatible electronically conductive polymer and a hydrophobic barrier layer therebetween. Typically, the conductive layer or layers are utilized as top and bottom electrodes and are coated on a number of substrates and may be in contact with a variety of layers. Application of a conductive layer/electrode comprising a water-compatible electronically conductive polymer directly on another aqueous-based layer, for example, a liquid crystal gelatin layer, may produce surface electrical resistance (SER) values that are unacceptably high. An unacceptably high SER value would typically result in a display which will not function or which will require very high voltage for switching. In order to get a desirable SER (<2000 ohms/square) from the conductive layer, one would typically coat a thick layer of the electronically conductive polymer, which leads to prohibitively low light transmission.

Without being bound to any theory, the loss of conductivity (higher SER) encountered when coating an aqueous-based conductive layer on a water swellable or water soluble adjacent layer is thought to arise from two possible mechanisms:

(1) intermixing of the aqueous conductive coating composition and the water swellable polymer in the adjacent layer, resulting in dilution of the conductive layer; and (2) poisoning of the conductive layer by the water swellable polymer from the adjacent layer, for example, gelatin, similar to an effect reported in U.S. Pat. No. 6,077,655, incorporated herein by reference.

In order to alleviate the problem, a barrier layer is provided between the polymer dispersed liquid crystal layer and the electronically conductive polymer layer. In this way, the aqueous coating composition comprising the electronically conductive polymer does not come in direct contact with the water soluble/swellable layer. The invention can be applied to any article with a water soluble/swellable polymer layer, and an aqueous coated electronically conductive polymer layer.

Figure 1:
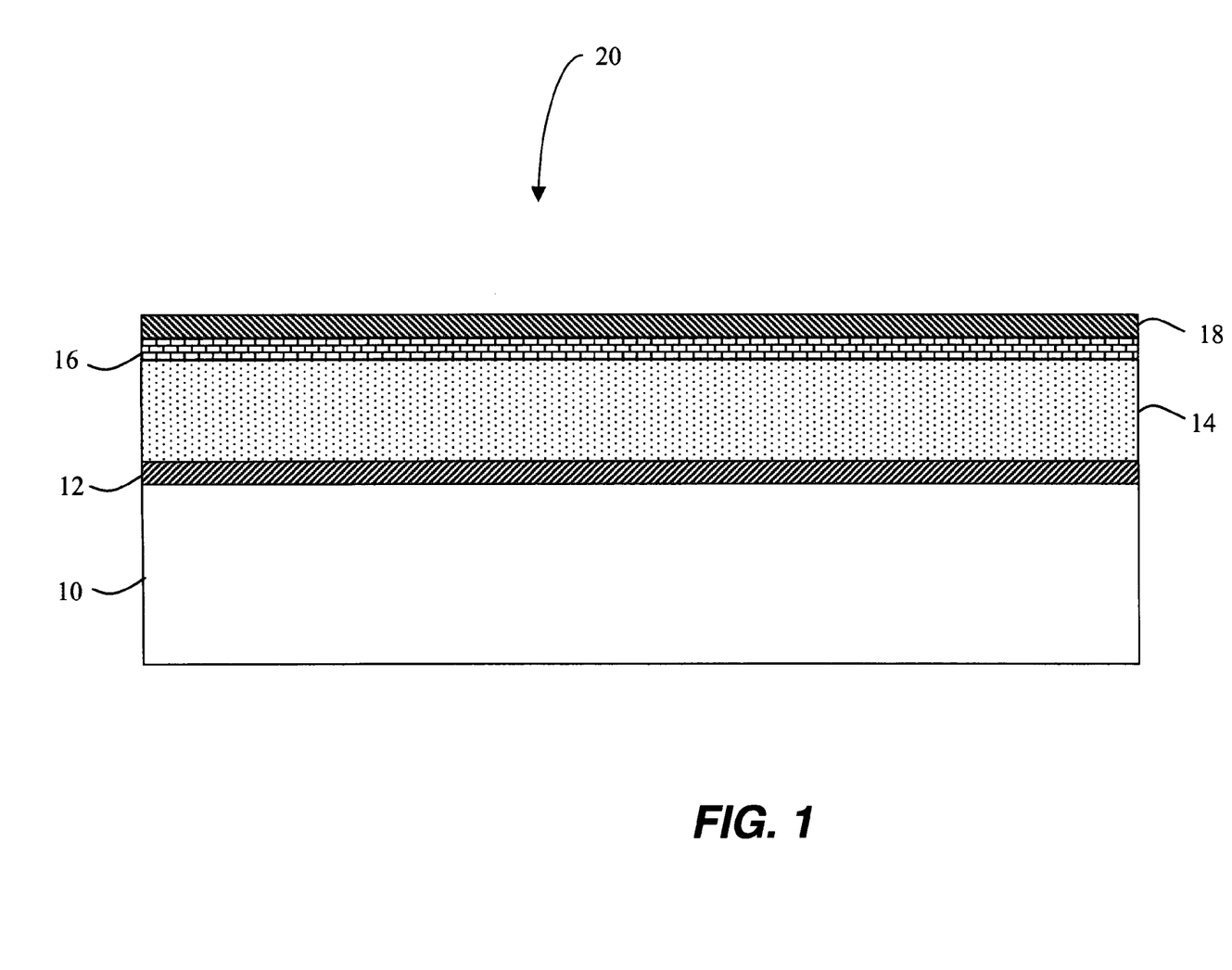
FIG. 1 illustrates a display according to the present invention having a substrate bearing a first conductor, an imageable layer comprising a water swellable or soluble polymer, a barrier layer between the imageable layer and a second conductor comprising an electronically conductive polymer, coated from an aqueous coating composition.

The invention is best practiced when a polymer based barrier layer is coated over the water soluble/swellable polymer-dispersed liquid crystal layer, and then subsequently overcoated with the conductive polymer layer. In one embodiment, the invention provides a display comprising a substrate, a first conductor, an imageable layer comprising a water swellable or soluble polymer, a barrier layer and a second conductor comprising an electronically conductive polymer, coated from an aqueous coating composition. Such an embodiment is schematically illustrated in FIG. 1 showing a sheet 20 comprising a substrate 10, and a first conductor 12; an imageable layer 14, comprising a water swellable polymer dispersed liquid crystal layer, coated on the first conductor 12; a barrier layer 16 coated upon this imageable layer 14; and a second conductive layer 18, comprising an electronically conductive polymer layer, coated from an aqueous coating composition over the barrier layer 16.

A color contrast layer is preferably incorporated on the side of the imageable layer opposite to the viewing side. The aforementioned arrangement of first conductor, imageable layer, barrier layer and the second conductor comprising an electronically conductive polymer can be stacked multiple times with different color-sensitive imageable layers and suitable color contrast layer, on suitable substrate(s) for multi-color displays. Such schemes are discussed in U.S. patent application Ser. Nos. 10/851,566 and 11/059,270, incorporated herein by reference.

The imageable layer can contain an electrically imageable material. The electrically imageable material can be light emitting or light modulating. Light emitting materials can be inorganic or organic in nature. Particularly preferred are organic light emitting diodes (OLED) or polymeric light emitting diodes (PLED). The light modulating material can be reflective or transmissive. Light modulating materials can be electrochemical, electrophoretic, such as Gyricon particles, electrochromic, or liquid crystals. The liquid crystalline material can be twisted nematic (TN), super-twisted nematic (STN), ferroelectric, magnetic, or chiral nematic liquid crystals. Especially preferred are chiral nematic liquid crystals. The chiral nematic liquid crystals can be polymer dispersed liquid crystals (PDLC). Structures having stacked imaging layers or multiple support layers, however, are optional for providing additional advantages in some case.

In a preferred embodiment, the electrically imageable material can be addressed with an electric field and then retain its image after the electric field is removed, a property typically referred to as "bistable". Particularly suitable electrically imageable materials that exhibit "bistability" are electrochemical, electrophoretic, such as Gyricon particles, electrochromic, magnetic, or chiral nematic liquid crystals. Especially preferred are chiral nematic liquid crystals. The chiral nematic liquid crystals can be polymer dispersed liquid crystals (PDLC).

The electrically modulated material may also be a printable, ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. Nos. 6,147,791, 4,126,854 and 6,055,091, the contents of which are herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between about 5 microns and about 200 microns, and the particle diameters of the charged particles are between about one-thousandth and one-fifth the size of the particle diameters of the microcapsules.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material: There may be multiple layers of electrically modulated material. Different layers or regions of the electrically modulated material display material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of non-electrically modulated material based materials that have the previously listed radiation absorbing or emitting characteristics. The electrically modulated material employed in connection with the present invention preferably has the characteristic that it does not require power to maintain display of indicia.

Most preferred is a support bearing a conventional polymer dispersed light modulating material. The liquid crystal (LC) is used as an optical switch. The liquid crystal material is provided with two conductive electrodes to induce an electric field, which can cause a phase change or state change in the liquid crystal material, the liquid crystal exhibiting different light reflecting characteristics according to its phase and/or state.

As used herein, a "liquid crystal display" (LCD) is a type of flat panel display used in various electronic devices. At a minimum, an liquid crystal display comprises a substrate, at least one conductive layer and a liquid crystal layer. liquid crystal displays may also comprise two sheets of polarizing material with a liquid crystal solution between the polarizing sheets. The sheets of polarizing material may comprise a substrate of glass or transparent plastic. The liquid crystal display may also include functional layers.

In a preferred embodiment, the electrically imageable layer can comprise chiral nematic liquid crystal. In the fully evolved focal conic state, the chiral nematic liquid crystal is transparent, passing incident light, which is absorbed by the light absorber to create a black image. Progressive evolution of the focal conic state causes a viewer to perceive a reflected light that transitions to black as the chiral nematic material changes from planar state to a focal conic state. The transition to the light transmitting state is progressive, and varying the low voltage time permits variable levels of reflection. These variable levels may be mapped out to corresponding gray levels, and when the field is removed, the light modulating layer maintains a given optical state indefinitely. This process is more fully discussed in U.S. Pat. No. 5,437,811, incorporated herein by reference.

Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered liquid crystaldevices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known liquid crystal display devices include chemically etched, transparent, conductive layers overlying a glass substrate as described in U.S. Pat. No. 5,667,853, incorporated herein by reference.

In one embodiment, a chiral nematic liquid crystal composition may be dispersed in a continuous matrix. Such materials are referred to as "polymer dispersed liquid crystal" materials or "PDLC" materials. Such materials can be made by a variety of methods. For example, Doane et al. (*Applied Physics Letters*, 48, 269 (1986)) disclose a polymer dispersed liquid crystal comprising approximately 0.4 µm droplets of nematic liquid crystal 5CB in a polymer binder. A phase separation method is used for preparing the polymer dispersed liquid crystal. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a polymer dispersed liquid crystal comprising a chiral nematic mixture in a polymer binder. Once again a phase separation method is used for preparing the polymer dispersed liquid crystal. The liquid crystal material and polymer, preferably a hydroxy functionalized polymethylmethacrylate, along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

The contrast of the display is degraded if there is more than a substantial monolayer of N*LC domains. The term "substantial monolayer" is defined by the Applicants to mean that, in a direction perpendicular to the plane of the display, there is no more than a single layer of domains sandwiched between the electrodes at most points of the display or the imaging layer, preferably at 75 percent or more of the points or area of the display, most preferably at 90 percent or more of the points or area of the display. In other words, at most, only a minor portion, that is, preferably less than 10 percent of the points or area of the display has more than a single domain, that is, two or more domains, between the electrodes in a direction perpendicular to the plane of the display, compared to the amount of points or area of the display at which there is only a single domain between the electrodes.

The amount of material needed for a monolayer can be accurately determined by calculation based on individual domain size, assuming a fully closed packed arrangement of domains. In practice, there may be imperfections in which gaps occur and some unevenness due to overlapping droplets or domains. On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell or imaging layer thickness for a majority of the domains. Such a dimensional relationship is shown in U.S. Pat. No. 6,061,107, hereby incorporated by reference in its entirety.

There are alternative display technologies to liquid crystal displays that can be used, for example, in flat panel displays. A notable example is organic or polymer light emitting devices (OLEDs) or (PLEDs), which are comprised of several layers in which one of the layers is comprised of an organic material that can be made to electroluminesce by applying a voltage across the device. An OLED device is typically a laminate formed in a substrate such as glass or a plastic polymer. A light emitting layer of a luminescent organic solid, as well as adjacent semiconductor layers, are sandwiched between an anode and a cathode. The semiconductor layers can be hole injecting and electron injecting layers. PLEDs can be considered a subspecies of OLEDs in which the luminescent organic material is a polymer. The light emitting layers may be selected from any of a multitude of light emitting organic solids, e.g., polymers that are suitably fluorescent or chemiluminescent organic compounds. Such compounds and polymers include metal ion salts of 8-hydroxyquinolate, trivalent metal quinolate complexes, trivalent metal bridged quinolate complexes, Schiff-based divalent metal complexes, tin (IV) metal complexes, metal acetylacetonate complexes, metal bidenate ligand complexes incorporating organic ligands, such as 2-picolylketones, 2-quinaldylketones, or 2-(o-phenoxy) pyridine ketones, bisphosphonates, divalent metal maleonitriledithiolate complexes, molecular charge transfer complexes, rare earth mixed chelates, (5-hydroxy) quinoxaline metal complexes, aluminum tris-quinolates, and polymers such as poly(p-phenylenevinylene), poly(dialkoxyphenylenevinylene), poly(thiophene), poly(fluorene), poly (phenylene), poly(phenylacetylene), poly(aniline), poly(3-alkylthiophene), poly(3-octylthiophene), and poly(N-vinylcarbazole). When a potential difference is applied across the cathode and anode, electrons from the electron injecting layer and holes from the hole injecting layer are injected into the light emitting layer; they recombine, emitting light. OLEDs and PLEDs are described in the following United States patents, all of which are incorporated herein by this reference: U.S. Pat. No. 5,707,745 to Forrest et al., U.S. Pat. No. 5,721,160 to Forrest et al., U.S. Pat. No. 5,757,026 to Forrest et al., U.S. Pat. No. 5,834,893 to Bulovic et al., U.S. Pat. No. 5,861,219 to Thompson et al., U.S. Pat. No. 5,904,916 to Tang et al., U.S. Pat. No. 5,986,401 to Thompson et al., U.S. Pat. No. 5,998,803 to Forrest et al., U.S. Pat. No. 6,013,538 to Burrows et al., U.S. Pat. No. 6,046,543 to Bulovic et al., U.S. Pat. No. 6,048,573 to Tang et al., U.S. Pat. No. 6,048,630 to Burrows et al., U.S. Pat. No. 6,066,357 to Tang et al., U.S. Pat. No. 6,125,226 to Forrest et al., U.S. Pat. No. 6,137,223 to Hung et al., U.S. Pat. No. 6,242,115 to Thompson et al., and U.S. Pat. No. 6,274,980 to Burrows et al.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexyibiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyidioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'-X-Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-; wherein Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH═CH—, —C≡C—, —N═N(O)—, —CH═CY'—, —CH═N(O)—, —CH2—CH2—, —CO—O—, —CH2—O—, —CO—S—, —CH2—S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein. Typical well known dopant classes include 1,1-binaphthol derivatives; isosorbide and similar isomannide esters as disclosed in U.S. Pat. No. 6,217,792; TADDOL derivatives as disclosed in U.S. Pat. No. 6,099,751; and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c)$$

where c is the concentration of the chiral dopant and HTP is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, U.S. application Ser. No. 07/969,093 and Ser. No. 08/057,662; Yang et al., Appl. Phys. Lett. 60(25) pp 3102-04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

In a preferred embodiment, a light modulating layer is deposited over a first conductor. The light modulating layer contains a chiral nematic liquid crystal. The selected material preferably exhibits high optical and electrical anisotropy and matches the index of refraction of the carrier polymer, when the material is electrically oriented. Examples of such materials are E. Merck's BL-03, BL-048 or BL-033, which are available from EM Industries of Hawthorne, N.Y. Other light reflecting or diffusing modulating, electrically operated materials can also be coated, such as a micro-encapsulated electrophoretic material in oil.

The liquid crystal can be a chiral doped nematic liquid crystal, also known as cholesteric liquid crystal, such as those disclosed in U.S. Pat. No. 5,695,682. Application of fields of various intensity and duration change the state of chiral doped nematic materials from a reflective to a transmissive state. These materials have the advantage of maintaining a given state indefinitely after the field is removed. Cholesteric liquid crystal materials can be Merck BL112, BL118 or BL126 that are available from EM Industries of Hawthorne, N.Y. The light modulating layer is effective in two conditions.

Liquid crystal domains may be preferably made using a limited coalescence methodology, as disclosed in U.S. Pat. Nos. 6,556,262 and 6,423,368, incorporated herein by reference. Limited coalescence is defined as dispersing a light modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

An immiscible, field responsive light modulating material along with a quantity of colloidal particles is dispersed in an aqueous system and blended to form a dispersion of field responsive, light modulating material below a coalescence size. When the dispersion, also referred to herein as an emulsion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light modulating, electrically responsive sheets with improved optical efficiency.

Specifically, a liquid crystal material may be dispersed an aqueous bath containing a water swellable or soluble binder material, preferably deionized gelatin, polyvinyl alcohol (PVA) or polyethylene oxide (PEO), with deionized gelatin being of most preference. Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

In an exemplary embodiment, a liquid crystalline material is homogenized in the presence of finely divided silica, a coalescence limiting material, (LUDOX® from duPont Corporation). A promoter material, such as a copolymer of adipic acid and 2-(methylamino) ethanol, is added to the aqueous bath to drive the colloidal particles to the liquid-liquid interface. The liquid crystal material is dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and, 8 micron were produced. These emulsions were diluted into gelatin solution for subsequent coating.

Domains of a limited coalescent material maintain their uniform size after the addition of the surfactant and after being machine coated. There were few, if any, parasitic domains having undesirable electro-optical properties within the dried coatings produced by the limited coalescence method. Coatings made using limited coalescence having a domain size of about 2 microns may have the greatest translucence. For constant material concentrations and coating thickness, limited coalescent materials having a domain size of about 2 microns in size are significantly more translucent than any sized domains formed using conventional dispersion.

Sheets made by the limited coalescence process have curves similar to those of conventionally dispersed materials. However, with 8 to 10 micron domains, the material may demonstrate reduced scattering due to the elimination of parasitic domains. Conventionally dispersed cholesteric materials contain parasitic domains, which reflect light in wavelengths outside the wavelengths reflected by the cholesteric material. Limited coalescent dispersions have reduced reflection in other wavelengths due to the elimination of parasitic domains. The increased purity of color is important in the development of full color displays requiring well separated color channels to create a full color image. Limited coalescent cholesteric materials provide purer light reflectance than cholesteric liquid crystal material dispersed by conventional methods. Such materials may be produced using conventional photographic coating machinery.

In order to provide suitable formulations for applying a layer containing the liquid crystal domains, the dispersions are combined with a hydrophilic colloid, gelatin being the preferred material. Surfactants may be included with the liquid crystal dispersion prior to the addition of gelatin in order to prevent the removal of the particulate suspension stabilizing agent from the droplets. This aids in preventing further coalescence of the droplets.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable promoters to drive the suspension stabilizing agent to the interface of the droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to prevent the hydrophilic colloid from removing the suspension stabilizing agent from the surface of the droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

Suitable binder can be any water swellable or soluble binder including naturally occurring substances such as proteins, protein derivatives, cellulose derivatives, for example, cellulose esters, gelatins and gelatin derivatives, polysaccharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is however the most preferred binder because of its desirable physical properties. The gelatin binder may optionally contain a hardener for use in the present invention. In the context of this invention, hardeners are defined as any additive which causes chemical crosslinking in gelatin or gelatin derivatives.

Many conventional hardeners are known to crosslink gelatin. Gelatin crosslinking agents, also referred to as the hardener, are included in an amount of at least about 0.01 wt. % and preferably from about 0.1 to about 10 wt. % based on the weight of the solid dried gelatin material used. By dried gelatin, it is meant that the gelatin is substantially dry at ambient conditions as, for example, obtained from Eastman Gel Co., as compared to swollen gelatin. More preferably, the gelatin is present in the amount of from about 1 to about 5 percent by weight. More than one gelatin crosslinking agent can be used if desired.

Inorganic hardeners include compounds such as aluminum salts, especially the sulfate, potassium and ammonium alums, ammonium zirconium carbonate, chromium salts such as chromium sulfate and chromium alum, and salts of titanium dioxide, zirconium dioxide, and the like. Representative organic hardeners or gelatin crosslinking agents useful in the present invention may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZâ 700), polymers of the type having a glyoxal polyol reaction product consisting of 1 anhydroglucose unit: 2 glyoxal units (SEQUAREZâ 755 obtained from Sequa Chemicals, Inc.), DME-Melamine non-formaldehyde resins such as Sequa CPD3046-76 obtained from Sequa Chemicals Inc., 2,3-dihydroxy-1,4-dioxane (DHD), and the like. Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). These compounds can be readily prepared using the published synthetic procedure or routine modifications that would be readily apparent to one skilled in the art of synthetic organic chemistry.

Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners). Research Disclosure is published by Kenneth Mason Publications, Ltd., Dudley House, 12 North St., Emsworth, Hampshire P010 7DQ, England. As indicated above, both inorganic and organic hardeners are known and can be used in the present invention. Organic hardening agents are preferred over inorganic hardeners.

Olefinic hardeners are most preferred. As mentioned above, olefinic hardeners are compounds with active olefinic functionality, including divinyl ketone, resorcinol bis(vinylsulfonate) (U.S. Pat. No. 3,689,274, incorporated herein in by reference), 4,6-bis(vinylsulfonyl)-m-xylene (U.S. Pat. No. 2,994,611, incorporated herein in by reference), bis(vinylsulfonylalkyl) ethers and amines (U.S. Pat. No. 3,642,486 and U.S. Pat. No. 3,490,911, incorporated herein in by reference), 1,3,5-tris(vinylsulfonyl) hexahydro-s-triazine, diacrylamide (U.S. Pat. No. 3,635,718, incorporated herein in by reference), 1,3-bis(acryloyl)urea (U.S. Pat. No. 3,640,720, incorporated herein in by reference), N,N'-bismaleimides (U.S. Pat. No. 2,992,109, incorporated herein in by reference) bisisomaleimides (U.S. Pat. No. 3,232,763, incorporated herein in by reference), bis(2-acetoxyethyl) ketone (U.S. Pat. No. 3,360,372, incorporated herein in by reference), and 1,3,5-triacryloylhexahydro-s-triazine. Blocked active olefins of the type bis(2-acetoxyethyl) ketone and 3,8-dioxodecane-1,10-bis(pyridinium perchlorate) may also be used.

Among hardeners of the active olefin type, a preferred class of hardeners particularly are compounds comprising two or more vinyl sulfonyl groups. These compounds are hereinafter referred to as "vinyl sulfones." Compounds of this type are described in numerous patents including, for example, U.S. Pat. Nos. 3,490,911, 3,642,486, 3,841,872 and 4,171,976, incorporated herein in by reference. Vinyl sulfone hardeners are believed to be effective as hardeners as a result of their ability to crosslink polymers making up the colloid.

A preferred class of vinyl sulfone hardeners for use in this invention are compounds of the formula:

wherein n is an integer with a value of 2 to 6 and Z is an organic linking group with a valence equal to n. Suitable examples of the organic linking group represented by Z include alkyl, alkylene, aryl, arylene, aralkyl and alkaryl groups. As a further example Z can be a heteroatom such as a nitrogen atom or an ether oxygen atom.

In the above formula Z is preferably

-A-

—O-A-O—, or

-D- where A is an alkylene group containing 1 to 8 carbon atoms which may be unsubstituted or substituted and the alkylene chain may be interrupted by one or more hetero atoms or organic groups, or an arylene group, which may be substituted or unsubstituted, and D is a trivalent alkylene group, a trivalent arylene group which may be substituted with one or more additional $CH_2$=CH—$SO_2$— groups, a trivalent cyclic alkylene group which may be substituted with one or more $CH_2$=CH—$SO_2$— groups, or a trivalent heterocyclic group which may be substituted with one or more $CH_2$=CH—$SO_2$— groups. Preferred substituents for A include —OH, phenyl, aralkyl, such as phenethyl, or $CH_2$=CH—$SO_2$— groups. The aryl moiety of the aralkyl group may be sulfonated. The alkylene group may be interrupted by one or more of the following: oxygen atoms, arylene groups, cycloalkyl groups, —NHCONH—, or —N—R, where R is an alkyl group containing 1 to 8 carbon atoms.

A particularly preferred class of vinyl sulfone hardeners for use in this invention are bis(vinylsulfonyl)alkane hardeners of the formula:

where x is an integer with a value of from 1 to 3.

A preferred vinyl sulfone hardener for use in this invention is bis(vinylsulfonyl)methane (BVSM) which has the formula:

Another preferred vinyl sulfone hardener for use in this invention is bis(vinylsulfonylmethyl)ether (BVSME) which has the formula:

The vinyl sulfone hardeners described herein can be used in any effective amount in hardening gelatin. Suitable amounts are typically in the range of from about 0.5 to about 10 percent by weight, based on the weight of gelatin, and more preferably in the amount of from about 1 to about 5 percent by weight.

The substrate useful for the present invention can be any rigid or flexible substrate. The substrates can be transparent, translucent or opaque, and may be colored or colorless. Rigid substrates can include glass, metal, ceramic and/or semiconductors. Flexible substrates, especially those comprising a plastic substrate, are preferred for their versatility and ease of manufacturing, coating and finishing.

The flexible plastic substrate can be any flexible self-supporting plastic film that substrates the conductive polymeric film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, for example, deposition temperature, and annealing temperature, as well as post-manufacturing conditions such as in a process line of a displays manufacturer. Certain of the plastic substrates discussed below can withstand higher processing temperatures of up to at least about 200° C., some up to 300°-350° C., without damage.

Typically, the flexible plastic substrate can comprise any of the following materials: polyester or polyester ionomer, polyethersulfone (PES), polycarbonate (PC), polysulfone, a phenolic resin, an epoxy resin, polyimide, polyetherester, polyetheramide, cellulose nitrate, cellulose acetate such as cellulose diacetate or cellulose triacetate, poly(vinyl acetate), polystyrene, polyolefins including polyolefin ionomers, polyamide, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy)fluoropolymer (PFA), poly(ether ether ketone) (PEEK), poly(ether ketone) (PEK), poly(ethylene tetrafluoroethylene)fluoropolymer (PETFE), poly(methyl methacrylate) (PMMA), various acrylate/methacrylate copolymers, natural or synthetic paper, resin-coated or laminated paper, voided polymers including polymeric foam, microvoided polymers, microporous materials, fabric, or any combinations thereof.

Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L. P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although the substrate can be transparent, translucent or opaque, for most display applications transparent members comprising transparent substrate(s) are preferred. Although various examples of plastic substrates are set forth above, it should be appreciated that the flexible substrate can also be formed from other materials such as flexible glass and ceramic.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec." Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

The most preferred flexible plastic substrate is a polyester because of its superior mechanical and thermal properties as well as its availability in large quantity at a moderate price. From an optical performance perspective, polymers such as cellulose acetate are highly preferred because of their low birefringence.

The particular polyester chosen for use can be a homopolyester or a co-polyester, or mixtures thereof as desired. The polyester can be crystalline or amorphous or mixtures thereof as desired. Polyesters are normally prepared by the condensation of an organic dicarboxylic acid and an organic diol and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly(cyclohexlenedimethylene), terephthalate) poly(ethylene dodecate), poly(butylene terephthalate), poly(ethylene naphthalate), poly(ethylene(2, 7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly (decamethylene sebacate), poly(dimethylpropiolactone), poly(para-hydroxybenzoate) (Ekonol), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel) (cis), and poly (1,4-cyclohexylene dimethylene terephthalate (Kodel) (trans).

Polyester compounds prepared from the condensation of a diol and an aromatic dicarboxylic acid is preferred for use in this invention. Illustrative of such useful aromatic carboxylic acids are terephthalic acid, isophthalic acid and an α-phthalic acid, 1,3-napthalenedicarboxylic acid, 1,4napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane, and the like. Of the aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred.

Most preferred cellulose acetate for use in the present invention is cellulose triacetate, also known as triacetylcellulose or TAC. TAC film has traditionally been used by the photographic industry due to its unique physical properties, and flame retardance. TAC film is also the preferred polymer film for use as a cover sheet for polarizers used in liquid crystal displays.

The manufacture of TAC films by a casting process is well known and includes the following process. A TAC solution in organic solvent (dope) is typically cast on a drum or a band, and the solvent is evaporated to form a film. Before casting the dope, the concentration of the dope is typically so adjusted that the solid content of the dope is in the range of 18 to 35 wt. %. The surface of the drum or band is typically polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987) -115035, all incorporated herein by reference.

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include o-acetyltriethyl citrate (OACTE) and o-acetyltributyl citrate (OACTB). The amount of the plasticizer is in the range of typically 0.1 to 25 wt. %, conveniently 1 to 20 wt. %, desirably 3 to 15 wt. % based on the amount of cellulose acetate.

The substrate useful for application in display devices can be planar and/or curved. The curvature of the substrate can be characterized by a radius of curvature, which may have any value. Alternatively, the substrate may be bent so as to form an angle. This angle may be any angle from 0° to 360°, including all angles therebetween and all ranges therebetween. If the substrate is electrically conducting, an insulating material such as a non-conductive polymer may be placed between the substrate and the conducting polymer.

The substrate may be of any thickness, such as, for example $10^{-8}$ cm to 1 cm including all values in between and all ranges therebetween. Thicker and thinner layers may be used. The substrate need not have a uniform thickness. The preferred shape is square or rectangular, although any shape may be used. Before the substrate is coated with the conducting polymer it may be physically and/or optically patterned, for example, by rubbing, by the application of an image, by the application of patterned electrical contact areas, by the presence of one or more colors in distinct regions, by embossing, microembossing, and microreplication.

The substrate can comprise a single layer or multiple layers according to need. The multiplicity of layers may include any number of auxiliary layers such as antistatic layers, tie layers or adhesion promoting layers, abrasion resistant layers, curl control layers, conveyance layers, barrier layers, splice providing layers, UV absorption layers, optical effect providing layers, such as antireflective and antiglare layers, waterproofing layers, adhesive layers, imaging layers and the like.

The polymer substrate may be formed by any method known in the art such as those involving extrusion, coextrusion, quenching, orientation, heat setting, lamination, coating and solvent casting. It is preferred that the polymer substrate is an oriented sheet formed by any suitable method known in the art, such as by a flat sheet process or a bubble or tubular process. The flat sheet process involves extruding or coextruding the materials of the sheet through a slit die and rapidly quenching the extruded or coextruded web upon a chilled casting drum so that the polymeric component(s) of the sheet are quenched below their solidification temperature.

The quenched sheet is then biaxially oriented by stretching in mutually perpendicular directions at a temperature above the glass transition temperature of the polymer(s). The sheet may be stretched in one direction and then in a second direction or may be simultaneously stretched in both directions. The preferred stretch ratio in any direction is at least 3:1. After the sheet has been stretched, it is heat set by heating to a temperature sufficient to crystallize the polymers while restraining to some degree the sheet against retraction in both directions of stretching.

The polymer sheet may be subjected to any number of coatings and treatments, after extrusion, coextrusion, and orientation or between casting and full orientation, to improve its properties, such as printability, barrier properties, heat-sealability, spliceability, adhesion to other substrates and/or imaging layers. Examples of such coatings include acrylic coatings for printability, and polyvinylidene halide for heat seal properties. Examples of such treatments may include flame, plasma and corona discharge treatment, ultraviolet radiation treatment, ozone treatment and electron beam treatment to improve coatability and adhesion. Further examples of treatments may be calendaring, embossing and patterning to obtain specific effects on the surface of the web. The polymer sheet can be further incorporated in any other suitable substrate by lamination, adhesion, cold or heat sealing, extrusion coating, or any other method known in the art.

The conductive layers of the invention can comprise the same or different conductive materials. The conductive layers may or may not be transparent. However, the conductive layer closer to the viewing side is most desirably transparent.

Suitable electronically conductive polymers that are preferred for incorporation in the conductive layer are those with conjugated backbones, such as those disclosed in U.S. Pat. Nos. 6,025,119, 6,060,229, 6,077,655, 6,096,491, 6,124,083, 6,162,596, 6,187,522, and 6,190,846, incorporated herein in by reference. Conjugation means that the polymer molecules have alternating double and single bonds which provide a pathway for free-electron charge carriers. These electronically conductive polymers include substituted or unsubstituted aniline-containing polymers as disclosed in U.S. Pat. Nos. 5,716,550, 5,093,439 and 4,070,189), substituted or unsubstituted thiophene-containing polymers as disclosed in U.S. Pat. Nos. 5,300,575, 5,312,681, 5,354,613, 5,370,981, 5,372,924, 5,391,472, 5,403,467, 5,443,944, 5,575,898, 4,987,042 and 4,731,408, incorporated herein in by reference, substituted or unsubstituted pyrrole-containing polymers as disclosed in U.S. Pat. Nos. 5,665,498 and 5,674,654, incorporated herein in by reference, and poly(isothianaphthene) or derivatives thereof. These conducting polymers may be soluble or dispersible in organic solvents or water or mixtures thereof. Preferred conducting polymers for the present invention include pyrrole-containing polymers, aniline-containing polymers and thiophene-containing polymers. More preferred in the list is electronically conductive polythiophene, preferably polythiophene present in a cationic form with a polyanion. Typically, these polymers are dispersible in aqueous medium because of the presence of the polyanion, and hence, are environmentally desirable.

A preferred electronically conductive polythiophene is prepared by the oxidative polymerization of 3,4-dialkoxythiophene or 3,4-alkylenedioxythiophene in the presence of a polyanion. Typically, such polymers are known as poly (3,4-ethylenedioxythiophene styrene sulfonate), which is a combination of poly (3,4-ethylenedioxythiophene) and polystyrenesulfonic acid (polystyrene sulfonate). The most preferred electronically conductive polymers include poly(3,4-ethylene dioxythiophene styrene sulfonate) which comprises poly(3,4-ethylene dioxythiophene) in a cationic form with polystyrenesulfonic acid. The advantage of choosing the polymer arises from the fact that it is primarily water based, stable polymer structure to light and heat, stable dispersion and cause minimum concern for storage, health, environmental and handling.

Preparation of the polythiophene based polymers has been discussed in detail in a publication titled "Poly(3,4-ethylenedioxythiophene) and its derivatives: past, present and future" by L. B. Groenendaal, F. Jonas, D. Freitag, H. Pielartzik and J. R. Reynolds in Advanced Materials, (2000), 12, No. 7, pp. 481-494, and references therein.

In a preferred embodiment, the electronically conductive polymer comprises:

a) a polythiophene according to Formula I in a cationic form, wherein each of R1 and R2 independently represents hydrogen or a C1-4 alkyl group or together represent an optionally substituted C1-4 alkylene group or a cycloalkylene group, preferably an ethylene group, an optionally alkyl-substituted methylene group, an optionally C1-12 alkyl- or phenyl-substituted 1,2-ethylene group, a 1,3-propylene group or a 1,2-cyclohexylene group; and n is 3 to 1000;

and b) a polyanion compound;

Polyanions used with these electronically conductive polymers include the anions of polymeric carboxylic acids such as polyacrylic acids, poly(methacrylic acid), and poly(maleic acid), and polymeric sulfonic acids such as polystyrenesulfonic acids and polyvinylsulfonic acids, the polymeric sulfonic acids being preferred for use in this invention because of its stability and availability in large scale. These polysulfonic acids may also be copolymers formed from vinylsulfonic acid monomers copolymerized with other polymerizable monomers such as the esters of acrylic acid and styrene. The molecular weight of the polyacids providing the polyanions preferably is 1,000 to 2,000,000 and more preferably 2,000 to 500,000. The polyacids or their alkali salts are commonly available, for example as polystyrenesulfonic acids and polyacrylic acids, or they may be produced using known methods. Instead of the free acids required for the formation of the electrically conducting polymers and polyanions, mixtures of alkali salts of polyacids and appropriate amounts of monoacids may also be used. The polythiophene to polyanion weight ratio can widely vary between 1:99 to 99:1, however, optimum properties such as high electrical conductivity and dispersion stability and coatability are obtained between 85:15 and 15:85, and more preferably between 50:50 and 15:85. The most preferred electronically conductive polymers include poly(3,4-ethylene dioxythiophene styrene sulfonate) which comprises poly(3,4-ethylene dioxythiophene) in a cationic form and polystyrenesulfonic acid.

Desirable results such as enhanced conductivity of the polythiophene layer can be accomplished by incorporating a conductivity enhancing agent (CEA). Preferred conductivity enhancing agents are organic compounds containing dihydroxy, poly-hydroxy, carboxyl, amide, or lactam groups, such as (1) those represented by the following Formula II:

$(OH)_n-R-(COX)_m$         II wherein m and n are independently an integer of from 1 to 20, R is an alkylene group having 2 to 20 carbon atoms, an arylene group having 6 to 14 carbon atoms in the arylene chain, a pyran group, or a furan group, and X is —OH or —NYZ, wherein Y and Z are independently hydrogen or an alkyl group; or (2) a sugar, sugar derivative, polyalkylene glycol, or glycerol compound; or (3) those selected from the group consisting of N-methylpyrrolidone, pyrrolidone, caprolactam, N-methyl caprolactam, dimethyl sulfoxide or N-octylpyrrolidone; or (4) a combination of the above.

Particularly preferred conductivity enhancing agents are sugar and sugar derivatives such as sucrose, glucose, fructose, lactose; sugar alcohols such as sorbitol, mannitol; furan derivatives such as 2-furancarboxylic acid, 3-furancarboxylic acid and alcohols. Ethylene glycol, glycerol, di- or triethylene glycol are most preferred because they provide the maximum conductivity enhancement.

The conductivity enhancing agent can be incorporated by any suitable method. Preferably the conductivity enhancing agent is added to the coating composition comprising the polythiophene. Alternatively, the coated polythiophene containing layer can be exposed to the conductivity enhancing agent by any suitable method, such as post-coating wash.

The concentration of the conductivity enhancing agent in the coating composition may vary widely depending on the particular organic compound used and the conductivity requirements. However, convenient concentrations that may be effectively employed in the practice of the present invention are about 0.5 to about 25 weight %; more conveniently 0.5 to 10 and more desirably 0.5 to 5 as it is the minimum effective amount.

For a transparent conductor, an optimum combination of visual light transmission and surface electrical resistance (SER) is desired, namely, high transmission and low SER. In this regard, an electronically conductive polymer layer with a "figure of merit (FOM)", of <150, preferably <100, and more preferably <50, as described in U.S. Ser. Nos. 10/944,570 and 10/969,889, both incorporated herein by reference, is desirable for the present invention. FOM values are determined by (1) measuring the visual light transmission (T) and the surface electrical resistance (SER) of the electronically conductive polymer layer at various thickness values of the layer, (2) plotting these data in a ln (1/T) vs. 1/SER space, and (3) then determining the slope of a straight line best fitting these data points. It was disclosed in U.S. Ser. Nos. 10/944,570 and 10/969,889 that ln (1/T) vs. 1/SER plots for electronically conductive polymer layers, comprising polythiophene in a cationic form with a polyanion compound, generate a linear relationship, preferably one passing through the origin, wherein the slope of such a linear plot is the FOM of the electronically conductive polymer layer. It is further found that lower the FOM value, more desirable is the electrical and optical characteristics of the electronically conductive polymer layer; namely, lower the FOM, lower is the SER and higher is the transparency of the conductive layer. For the instant invention, FOM values of <150, preferably ≦100, and more preferably ≦50 is found to generate most desired results for display applications.

Visual light transmission value T is determined from the total optical density at 530 nm, after correcting for the contributions of the uncoated substrate. A Model 361T X-Rite densitometer measuring total optical density at 530 nm, is best suited for this measurement. Visual light transmission, T, is related to the corrected total optical density at 530 nm, o.d.(corrected), by the following expression.

$$T=1/(10^{o.d.(corrected)})$$

The SER value is typically determined by a standard four-point electrical probe. For the instant invention two commercial grades of polythiophene dispersions, Baytron P and P HC supplied by H. C. Starck may be useful, with Baytron P HC being preferred.

In addition to the electronically conductive polymer, the conductive layer used in the invention may comprise a film-forming binder to improve the physical properties of the layer. In such an embodiment, the layer may comprise from about 1 to 95% of the film-forming polymeric binder. However, the presence of the film forming binder may increase the overall surface electrical resistivity of the layer. The optimum weight percent of the film-forming polymer binder varies depending on the electrical properties of the electronically conductive polymer, the chemical composition of the polymeric binder, and the requirements for the particular application.

Polymeric film-forming binders useful in this invention can include, but are not limited to, water-soluble or water-dispersible hydrophilic polymers such as gelatin, gelatin derivatives, maleic acid or maleic anhydride copolymers, polystyrene sulfonates, cellulose derivatives, such as carboxymethyl cellulose, hydroxyethyl cellulose, cellulose acetate butyrate, diacetyl cellulose, and triacetyl cellulose, polyethylene oxide, polyvinyl alcohol, and poly-N-vinylpyrrolidone. Other suitable binders include aqueous emulsions of addition-type homopolymers and copolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of polyurethanes and polyesterionomers.

Other ingredients that may be included in the layer containing the electronically conductive polymer include but are not limited to surfactants, defoamers or coating aids, charge control agents, additional conductive materials such as metals, graphitic carbon, single wall or multiwall carbon nanotubes, colorants, such as dyes and pigments, thickeners or viscosity modifiers, antiblocking agents, coalescing aids, crosslinking agents or hardeners, inorganic or polymeric particles, adhesion promoting agents, bite solvents or chemical etchants, lubricants, plasticizers, antioxidants, and other addenda that are well-known in the art. Preferred bite solvents can include any of the volatile aromatic compounds disclosed in U.S. Pat. No. 5,709,984, incorporated herein in by reference, as "conductivity-increasing" aromatic compounds, comprising an aromatic ring substituted with at least one hydroxy group or a hydroxy substituted substituents group. These compounds include phenol, 4-chloro-3-methyl phenol, 4-chlorophenol, 2-cyanophenol, 2,6-dichlorophenol, 2-ethylphenol, resorcinol, benzyl alcohol, 3-phenyl-1-propanol, 4-methoxyphenol, 1,2-catechol, 2,4-dihydroxytoluene, 4-chloro-2-methyl phenol, 2,4-dinitrophenol, 4-chlororesorcinol, 1-naphthol, 1,3-naphthalenediol and the like. These bite solvents are particularly suitable for polyester based polymer sheets used in the invention. Of this group, the most preferred compounds are resorcinol and 4-chloro-3-methyl phenol. Preferred surfactants suitable for these coatings include nonionic and anionic surfactants. Preferred hardeners suitable for these coatings include silane compounds such as those disclosed in U.S. Pat. No. 5,370,981, incorporated herein in by reference.

As indicated earlier, the first conductor may be similar in composition to the second conductor, thus comprising an electronically conductive polymer. Alternatively, the first conductor may be different and comprise conductive carbon, metal or a metal oxide. The conductive carbon can be in the form of finely divided graphite particles in a thermoplastic resin based ink. The conductive metals can include any metal but preferably a high conductivity metal such as gold, silver, platinum, copper, aluminum, indium, tin, palladium, vanadium, chromium, iron, cobalt, nickel and or mixtures thereof. The conductive metal oxides, which are preferred for high transparency, can include indium oxide, titanium oxide, cadmium oxide, gallium indium oxide, niobium oxide, tin oxide, indium tin oxide and the like. See, Int. Publ. No. WO 99/36261 by Polaroid Corporation, incorporated herein in by reference. In addition to the primary oxide such as indium tin oxide (ITO), the first conductive layer can also comprise a secondary metal oxide such as an oxide of cerium, titanium, zirconium, hafnium and/or tantalum. See, U.S. Pat. No. 5,667,853 to Fukuyoshi et al, incorporated herein in by reference. Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. Alternative to the metal oxide, higher transparency in the first conductor can also be achieved through the use of carbon nanotubes such as single wall or multiwall carbon nanotubes. For the practice of the present invention, electronically conductive polymers, carbon nanotubes and metal oxides such as indium tin oxide, are preferred for use in the first conductor.

The conductive layers used in the invention may be formed by any method known in the art. Such methods include air knife coating, gravure coating, hopper coating, roller coating, spray coating, electrochemical coating, inkjet printing, flexographic printing, screen printing, stamping and the like. In case of metal or metal oxides, the conductive layer can be formed by a low temperature sputtering technique or by a direct current sputtering technique, such as DC-sputtering or RF-DC sputtering, or by evaporation.

The conductive layers used in the invention should be sufficiently conductive to produce suitable electric field across the imageable layer. For this purpose the SER of the conductive layers should be less than 10,000 ohms/square preferably less than 5,000 ohms/square, more preferably less than 2000 ohms/square and most preferably less than 1000 ohms/square.

The conductive layers are preferably patterned into a plurality of electrodes. The conductive layer may be patterned irradiating the layer with ultraviolet (UV) or infrared (IR) radiation so that portions of the conductive layer are ablated therefrom. Such methods are known in the art. For example, it is known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference. Alternatively, the conductive layer may be patterned by pattern-wise deposition via inkjet printing, screen printing and/or any method disclosed in U.S. Ser. Nos. 10/944,570 and 10/969,889, incorporated herein in by reference and references therein. The patterned conductive layer may have a variety of dimensions. Exemplary dimensions may include line widths of 10 microns, and distances between lines, that is, electrode widths, of 200 microns.

The barrier layer used in the invention is formed over the imageable layer. The purpose of the barrier layer is to prevent or minimize contact between the water swellable or soluble polymer of the imageable layer and the overlying second conductor comprising the electronically conductive polymer layer, which is preferably coated from an aqueous coating composition.

The barrier layer can comprise any material, which can be inorganic or organic. Film forming polymeric materials are preferred because of their ability to be coated and cured on wide webs at high speed under normal manufacturing conditions. Alternatively a monomer or an oligomer can also be coated and polymerized subsequently. Preferred polymeric materials can be thermoplastic or thermosetting, with preference for thermoplastic materials.

Suitable polymeric film forming binders for use in the barrier layer include cellulose derivatives such as carboxymethyl cellulose, hydroxyethyl cellulose, cellulose acetate butyrate, diacetyl cellulose or triacetyl cellulose; addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins; polyurethanes; polyesters and polyesterionomers. It is preferred that the barrier layer provides some hydrophilicity in order to be compatible with the overlying electronically conductive polymer layer, which is preferably coated from aqueous coating compositions. In this regard aqueous dispersions of polyurethanes, polyesterionomers, and vinylidene halide copolymers are preferred film-forming binders. Preferably, the barrier layer comprises a polymer having hydrophilic functionality. The aforementioned polymers can also be coated from organic solvent based coating compositions to achieve adhesion, speed of drying or any other criteria.

Other ingredients that may be incorporated in the barrier layer include but are not limited to surfactants, defoamers or coating aids; charge control agents; conductive materials such as metals, metal containing particles, graphitic carbon, single wall or multiwall carbon nanotubes, and electronically conductive polymers; colorants, such as dyes and pigments; thickeners or viscosity modifiers, antiblocking agents; coalescing aids, crosslinking agents or hardeners; inorganic or polymeric particles, adhesion promoting agents; bite solvents or chemical etchants; lubricants; plasticizers, antioxidants, and other addenda that are well-known in the art. It should be noted that, when conductive materials are incorporated in the barrier layer, the SER of the barrier layer is expected to have a value of $10^6$ or higher.

The polymeric particles are preferably crosslinked. Preferred polymeric particles can include polystyrenes, polycarbonates, polyacetals, such as Delrin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, polyacrylates, such as polymethylmethacrylate, polyhydroxymethacrylate and polyhydroxyethyl acrylate, polyesters, silicone containing polymers such as polysiloxanes and the like, as well as mixtures and copolymers thereof.

A wide variety of inorganic particles can be used in the barrier layer in accordance with the invention. The inorganic particles can be electronically conductive or non-conductive. The electronically conductive particles are typically metal-containing particles containing donor heteratoms or vacancies. These particles are well known for their application in antistatic layers and include doped-metal oxides, metal antimonates, etc. as described in, for example, U.S. Pat. Nos. 4,275,103; 4,394,441; 4,416,963; 4,418,141; 4,431,764; 4,495,276; 4,571,361; 4,999,276; 5,122,445; 5,368,995; 5,457,013; 5,340,676; 5,719,016; and in commonly assigned copending U.S. Ser. No. 08/847,634, all incorporated herein by reference and metal borides, carbides, nitrides and silicides disclosed in Japanese Kokai No. JP 04-055,492, incorporated herein by reference. These electronically conductive particles can bring in additional advantage in the operation of the display device, such as reduced voltage.

Inorganic particles which are non-electronically conductive and suitable for the invention include oxides such as tin oxide, antimony oxide, iron oxide, chromium oxide, zinc oxide, silica, titania, alumina, yttria, ceria, niobia, zirconia, and mixtures or compounds thereof. Non-oxides such as carbides, borides, nitrides, and diamond are also suitable. Another group of inorganic particles include clay based materials such as allophanes and imogolites. Another suitable group of inorganic particles are natural or synthetic layered materials such as phyllosilicates. Phyllosilicates can include smectite clay, e.g., montmorillonite, particularly sodium montmorillonite, magnesium montmorillonite, calcium montmorillonite, nontronite, beidellite, volkonskoite, hectorite, saponite, sauconite, sobockite, stevensite, svinfordite, vermiculite, magadiite, kenyaite, pyrophyllite, or mixtures thereof. A particular mixture can include sodium montmorillonite, magnesium montmorillonite, and/or calcium montmorillonite. Other useful layered materials include mica or micacious minerals such as illite, mixed layered illite/smectite minerals, such as rectorite, tarosovite, ledikite, and admixtures of illites with the clay minerals named above. Other useful layered materials are the layered double hydroxides or hydrotalcites, such as $Mg_6Al_{3.4}(OH)_{18.8}(CO_3)$ 1.7 $H_2O$, and others. Other useful layered materials are talc and kaolinite. The particles can be surface-functionalized in order to obtain compatibility with any of the components in the coated layer and/or the coating composition.

The thickness of the barrier layer should be optimized to provide a barrier between the water swellable or soluble polymer and the electronically conductive polymer and at the same time not deleteriously affect the operation of the display device. A very thick barrier layer can act as an insulator between the imageable layer and the second conductor and substantially increase the operational voltage of the device. However, incorporating conductive materials in the barrier layer can alleviate this problem. It is preferred that the barrier layer is $\leq 10$ μm, more preferred to be $\leq 5$ μm, and most preferred to be $\leq 2$ μm, in thickness.

It is to be noted that a barrier layer can be optionally interspersed between the first conductor and the imageable layer, if the first conductor also comprises an aqueously coated electronically conductive polymer. However, the need for such a barrier layer can be eliminated if the first conductor is sufficiently dried before coming in contact with the water swellable or soluble polymer of the imageable layer.

The barrier layer can be formed over the imageable layer by any method known in the art such as air knife coating, gravure coating, hopper coating, roller coating, spray coating, inkjet printing, flexographic printing, screen printing, stamping, lamination and the like. In addition, the barrier layer can be formed by a low temperature sputtering technique or by a direct current sputtering technique, such as DC-sputtering or RF-DC sputtering, or by evaporation, particularly when the barrier layer comprises predominantly inorganic materials.

The liquid crystal display may also comprise at least one "functional layer." The functional layer may include any number layers such as antistatic layers, tie layers or adhesion promoting layers, abrasion resistant layers, curl control layers, conveyance layers, protective or barrier layers, dielectric layers, splice providing layers, UV absorption layers, optical effect providing layers, such as antireflective and antiglare layers, waterproofing layers, adhesive layers, imaging layers and the like. Preferred functional layers include protective layers, antistatic layers, dielectric layers and adhesive layers. It is also possible to combine more than one functional layer in to a single layer with multiple attributes. For example, a functional layer may act as a dielectric layer and an adhesive layer; similarly, a functional layer may act as a protective layer and a dielectric layer. The functional layer used in the invention can be applied in any of a number of well known techniques, such as dip coating, rod coating, blade coating, air knife coating, gravure coating and reverse roll coating, extrusion coating, slide coating, curtain coating, and the like.

A preferred protective layer may provide protection against gas or moisture permeation and may comprise SiOx, AlOx or ITO. The protective layer, for example, can include an acrylic hard coat, that functions to prevent laser light from penetrating to functional layers between the protective layer and the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$ ohms/square. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most common antistatic materials are inherently not that conductive and in those materials that are more conductive than $10^5$, there is usually some color associated with them that can reduce the overall transmission properties of the display. The antistatic layer is separate from the highly conductive electrode layers, i.e., the color contrast layer and the transparent conductive layer and provides the best static control when it is on the opposite side of the web substrate from that of the electrode layers. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nanopigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine. The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged.

The dielectric material may form an adhesive layer to subsequently bond an electrode to the light modulating layer. Conventional lamination techniques involving heat and pressure are employed to achieve a permanent durable bond. Certain thermoplastic polyesters, such as VITEL 1200 and 3200 resins from Bostik Corp., polyurethanes, such as MORTHANE CA-100 from Morton International, polyamides, such as UNIREZ 2215 from Union Camp Corp., polyvinyl butyral, such as BUTVAR B-76 from Monsanto, and poly(butyl methacrylate), such as ELVACITE 2044 from ICI Acrylics Inc. may also provide a substantial bond between the electrically conductive and light modulating layers.

The dielectric adhesive layer may be coated from common organic solvents at a dry thickness of one to three microns. The dielectric adhesive layer may also be coated from an aqueous solution or dispersion. Polyvinyl alcohol, such as AIRVOL 425 or MM-51 from Air Products, poly(acrylic acid), and poly(methyl vinyl ether/maleic anhydride), such as GANTREZ AN-119 from GAF Corp. can be dissolved in water, subsequently coated over the second electrode, dried to a thickness of one to three microns and laminated to the light modulating layer. Aqueous dispersions of certain polyamides, such as MICROMID 142LTL from Arizona Chemical, polyesters, such as AQ 29D from Eastman Chemical Products Inc., styrene/butadiene copolymers, such as TYLAC 68219-00 from Reichhold Chemicals, and acrylic/styrene copolymers such as RayTech 49 and RayKote 234L from Specialty Polymers Inc. can also be utilized as a dielectric adhesive layer as previously described.

Layers in the various embodiments may include radiation curable layers. The curing process can occur by any means known to those of skill in the art of curing coatings, such as through application of light, heat, airflow, chemical reaction, or some other source of energy. Light activation of the curing process can occur through exposure to ultraviolet, visible, infrared light, or combinations thereof, which then initiates a chemical reaction to cure the materials, such as through crosslinking polymerizations.

The following examples are provided to illustrate the invention.

EXAMPLES

Conductive Layer

Coating compositions for the electronically conductive polymer layers were prepared by mixing the following ingredients:

Baytron P HC dispersion, an aqueous dispersion of electronically conductive polymer poly(3,4-ethylene dioxythiophene styrene sulfonate) supplied by H. C. Starck Olin 10G, a nonionic surfactant supplied by Olin Chemicals;

N-methylpyrrolidone diethylene glycol isopropanol;

Details of the coating composition for the electronically conductive polymer layers are provide below:

| Coating composition CL-1 | |
|---|---|
| Olin 10G (10% aqueous) | 0.5 g |
| Baytron P HC (1.3% aqueous dispersion) | 88.71 g |
| Diethylene glycol | 4 g |
| N-methylpyrrolidone | 5.16 g |
| Isopropanol | 6.13 g |

Barrier Layer

Coating compositions for the barrier layers were prepared from the following ingredients:

Sancure 898, an aqueous polyurethane latex supplied by Noveon

NVcC, a terpolymer of acrylonitrile, vinylidene chloride and acrylic acid in the weight ratio of 15/79/6

Saponin, an anionic surfactant supplied by Acros

Water or a mixture of methyl ethyl ketone and 2-(2-ethoxyethoxy)ethanol in a weight ratio of 80/20

Details of the coating compositions of the barrier layers are provided below:

| Barrier layer BL-1 | |
|---|---|
| Olin 10G (10% aqueous) | 0.5 g |
| Sancure 898 (30% aqueous dispersion) | 33.4 g |
| Water | 66.6 g |

| Barrier layer BL-2 | |
|---|---|
| Saponin (10% aqueous) | 1.0 g |
| NVcC (30% aqueous dispersion) | 33.4 g |
| Water | 66.6 g |
| Barrier layer BL-3 | |
| NVcC (dry) | 4.0 g |
| methyl ethyl ketone/2-(2-ethoxyethoxy)ethanol | 96.0 g |

Support

The supports used in the following comparative samples and examples comprised of a 120 μm PET substrate, coated with a 0.1 μm layer of sputter deposited indium tin oxide (ITO) with an SER of 300 ohms/square, further coated with a 10 μm imageable layer comprising gelatin and droplets of cholesteric liquid crystal, contiguous with the ITO layer. The support will henceforth be referred to as PET/ITO/PDLC Comparative sample Comp. 1 and examples Ex. 1-4 were prepared by coating various thickness of barrier layers and electronically conductive polymer layers on the support. All coated layers were adequately dried. Subsequently the surface electrical resistance (SER) of the electronically conductive polymer layer was measured by a 4-point electrical probe Details about these various coatings and the SER of the electronically conductive polymer layers are provided in Table 1 below.

TABLE 1

| | | Barrier layer | | Electronically conductive polymer layer | | |
|---|---|---|---|---|---|---|
| Sample | Support | Coating composition | Thickness (μm) | Coating composition | Thickness (μm) | SER ohm/square |
| Comp. 1 | PET/ITO/PDLC | none | none | CL-1 | 0.33 | 2010 |
| Ex. 1 | PET/ITO/PDLC | BL-1 | 1.0 | CL-1 | 0.33 | 1350 |
| Ex. 2 | PET/ITO/PDLC | BL-2 | 1.0 | CL-1 | 0.33 | 534 |
| Ex. 3 | PET/ITO/PDLC | BL-3 | 0.4 | CL-1 | 0.17 | 461 |
| Ex. 4 | PET/ITO/PDLC | BL-3 | 0.4 | CL-1 | 0.33 | 207 |

Comparison of Comp. 1, without a barrier layer, with any of the Examples 1-4, with barrier layers, makes it amply clear that the barrier layer of the invention significantly reduces the SER of the electronically conductive polymer layer. Thus, the barrier layer of the invention solves the problem of high SER when the electronically conductive polymer layer is aqueously coated directly over the water swellable layer comprising gelatin and cholesteric liquid crystal. The examples Examples 2-4 also illustrate the superiority of the vinylidene halide copolymers as barriers, particularly when coated from an organic solvent based coating composition (BL-3).

Upon application of appropriate electric field between the ITO layer and the electronically conductive polymer layer, the droplets of cholesteric liquid crystal in the imageable layer of Example 2 and Example 3, were alternately switched between planar and focal conic states, demonstrating a functioning display device.

The invention has been described in detail with particular reference to certain preferred embodiments thereof, but it will be understood that variations and modifications can be effected within the spirit and scope of the invention.

The invention claimed is:

1. A bistable reflective display comprising a water-swellable, electrically modulated imaging layer comprising gelatin, an aqueous coated conductive layer comprising an electronically conductive polymer and a barrier layer therebetween, wherein said barrier layer prevents contact and intermixing or poisoning between said water-swellable, electrically modulated imaging layer and said aqueous coated conductive layer.

2. The bistable reflective display of claim 1 wherein said electrically modulated imaging layer comprises a light modulating material.

3. The bistable reflective display of claim 2 wherein said light modulating material is a chiral nematic liquid crystal material.

4. The bistable reflective display of claim 2 wherein said electrically modulated imaging layer comprises a polymer dispersed cholesteric liquid crystal layer.

5. The bistable reflective display of claim 1 wherein said electronically conductive polymer is in a cationic form with a polyanion.

6. The bistable reflective display of claim 1 wherein said electronically conductive polymer is polythiophene.

7. The bistable reflective display of claim 1 wherein said electronically conductive polymer is a pyrrole-containing polymer, an aniline-containing polymer or a thiophene-containing polymers.

8. The bistable reflective display of claim 1 wherein said electronically conductive polymer is dispersible in aqueous medium.

9. The bistable reflective display of claim 1 wherein said conductive layer has a figure of merit (FOM) value of <150.

10. The bistable reflective display of claim 1 wherein said conductive layer has a surface electrical resistance (SER) of less than 2000 ohms/sq.

11. The bistable reflective display of claim 1 wherein said conductive layer further comprises a conductivity enhancing agent (CEA).

12. The bistable reflective display of claim 1 wherein said barrier layer comprises a polymer having hydrophilic functionality.

13. The bistable reflective display of claim 1 wherein said barrier layer comprises polyurethane.

14. The bistable reflective display of claim 1 wherein said barrier layer comprises vinylidene halide.

15. The bistable reflective display of claim 1 wherein said barrier layer comprises polyester ionomers.

16. The bistable reflective display of claim 1 wherein said barrier layer comprises a solvent soluble polymer.

17. The bistable reflective display of claim 16 wherein said solvent is an organic solvent.

18. The bistable reflective display of claim 1 wherein said barrier layer is coated over said water-swellable, electrically modulated imaging layer, and then subsequently overcoated with said conductive layer.

19. The bistable reflective display of claim 1 wherein said barrier layer is equal to or less than 10 µm in thickness.

20. The bistable reflective display of claim 1 further comprising a substrate.

21. The bistable reflective display of claim 20 wherein said substrate is flexible.

22. The bistable reflective display of claim 20 wherein said substrate comprises polyester.

23. The bistable reflective display of claim 20 wherein said substrate comprises cellulose triacetate, also known as triacetylcellulose or TAC.

24. The bistable reflective display of claim 1 further comprising at least a second conductive layer on the side of said water-swellable, electrically modulated imaging layer opposite said conductive layer.

25. The bistable reflective display of claim 24 wherein said conductive layer closer to the viewing side of said bistable display is transparent.

26. The bistable reflective display of claim 1, wherein said electrically modulated imaging layer comprises a light emitting material.

27. A method for making a bistable reflective display comprising:
providing a substrate;
applying a water-swellable, electrically modulated imaging layer comprising gelatin;
applying an aqueous coated conductive layer; and
applying a barrier layer between said electrically modulated imaging layer and said aqueous coated conductive layer, wherein said barrier layer prevents contact and intermixing or poisoning between said water-swellable, electrically modulated imaging layer and said aqueous coated conductive layer.

28. The method of claim 27 wherein said conductive layer is applied to said substrate.

29. The method of claim 28 wherein said conductive layer is transparent.

30. The method of claim 27 wherein said water-swellable, electrically modulated imaging layer is applied to said substrate.

31. The method of claim 27 further comprising applying a second conductive layer on the side of said water-swellable, electrically modulated imaging layer opposite said conductive layer.

32. The method of claim 27, wherein said applying a water-swellable, electrically modulated imaging layer comprising gelatin includes applying a water-swellable, electrically modulated imaging layer comprising a light emitting material.

* * * * *